UNITED STATES PATENT OFFICE.

EDWARD C. C. STANFORD, OF DALMUIR, SCOTLAND.

PRODUCT FROM THYROID GLANDS AND PROCESS OF MAKING SAME.

SPECIFICATION forming part of Letters Patent No. 616,501, dated December 27, 1898.

Application filed August 8, 1898. Serial No. 688,125. (No specimens.)

*To all whom it may concern:*

Be it known that I, EDWARD C. C. STANFORD, chemical manufacturer, a subject of the Queen of Great Britain and Ireland, and a resident of Glenwood, Dalmuir, in the county of Dumbarton, Scotland, have invented certain new and useful improvements in the separation and obtainment of the active constituents of the thyroid glands of sheep or other animals and the production of a new substance containing such constituents, (for which I have applied for a patent in Great Britain, No. 24,891, dated October 27, 1897,) of which the following is a specification.

It is well known that the thyroid gland of the sheep and other animals contains substances which are exceedingly valuable as medicinal and remedial agents in the treatment of certain forms of disease. Hitherto for this purpose the gland itself, freed as far as possible from adherent fatty matter, has been used either in the raw state reduced to a fine state of division or first dried and afterward reduced to a powder; but the use of the gland itself in either of these forms is highly objectionable, because animal substances other than those which are its essentially-active principles as a medicinal or remedial agent, as before mentioned, may be present or dangerous bacteria may be developed and so may be introduced into the system of the patient to whom the gland is administered, because the gland, dried as above mentioned, cannot be heated to a temperature sufficiently high to destroy bacteria without impairing the beneficial properties of the gland, so that noxious animal secretions or bacteria may be present in an actively-injurious form.

The object of this invention is to extract the whole of the active and medicinal constituents of the gland, so as not only to obtain them in a concentrated form, but also so that they shall be free from the other animal secretions present in the gland and so as to avoid the presence of dangerous forms of bacteria which may otherwise be developed, as before mentioned.

It is generally known that the thyroid gland contains certain active principles, upon the presence of each of which I find its medicinal properties depend. One of these I have found to be an iodoglobulin, and this is the larger constituent. The other is thyroiodin, discovered by Baumann. Each of these bodies as existing in the thyroid gland I have found contains iodin, and the presence of both in the proportions in which they are respectively present in the gland I have also found to be requisite in order to secure the whole of the advantages which the use of the thyroid gland itself has long been known to possess.

I am aware that various processes have been proposed from time to time with the object of separating and obtaining the active principles of the thyroid gland free from the other animal substances with which these are associated. Among these I may mention the digestion of the glandular substance with solutions of caustic alkalies, or boiling it in dilute solutions of well-known mineral acids, or digesting it with water in closed vessels at temperatures considerably above the ordinary temperature of boiling water, (212° Fahrenheit,) or digesting it with saline solutions containing pepsin, or by extracting the glandular substance with solutions of common salt and subsequently precipitating the solutions so obtained from the glandular substance by means of a solution containing tannin. I have found, however, that neither of these processes separates the active medicinal principles of the gland in the form or in the same proportions in which they are naturally contained in the gland, for they all result in the destruction of the iodoglobulin entirely or in the partial separation only of thyroiodin or in its association with other bodies of an objectionable therapeutic form, so that by neither of the said processes are the active principles obtained in the form or in the proportions or in the condition in which they are present in the fresh glandular substance. Hence the substance produced by such processes has not nor can it have the same remedial or medicinal effect which the gland itself has and which it can only have when the two bodies—iodoglobulin and thyroiodin—are present in the resulting preparation in the same form and condition and in the same proportions as those in which they were originally present in the thyroid gland itself. I have found that the iodoglobulin can be wholly separated from the glandular substance by macerating the gland in cold water and that when it is so separated from the rest of the animal substances originally present the water can be evaporated by boiling at the ordinary temperature (212° Fahrenheit) and the extracted iodoglobulin be obtained uninjured and without in any way changing the form in which it existed in the original gland and without impairing its therapeutic properties, while in consequence of having been submitted to the temperature of 212° Fahrenheit it is sterilized and all danger which might otherwise result from the presence of bacteria is removed. The insoluble portion of the gland remaining after removal of the iodoglobulin can then be treated, as hereinafter described, so as to obtain the whole of the thyroiodin it contains, and this thyroiodin is to be mixed with the dried iodoglobulin. The mixture of these two products in the form of powder is the substance which contains the whole of the iodoglobulin and of the thyroiodin, which were present in the fresh glands and in the form and condition and in the proportions in which they were originally present in the said gland.

I prefer to carry out the process according to my invention in the following manner; but the proportions of the different substances employed and the conditions as to time and temperature may be varied within practical limits, and known chemical equivalents having the same chemical properties and effects may be substituted for the reagents I mention as those which appear to me to be preferable in treating the gland, so as to enable the best results and the largest yield to be obtained without departing from the nature of my invention.

I take the thyroid gland of the sheep or other animal and as far as possible I remove from it the adherent fat. I then reduce it to a moderately fine state of division by means of a mincing or chopping machine or by grinding or by any other suitable means by which the gland can be reduced to a paste-like condition. I then macerate the divided or pulverized gland in an excess of cold water. I find a convenient and effective proportion for the maceration is to use for every one part, by weight, of the gland from four to five parts, by weight, of water. The mixture is well stirred, and then the whole is allowed to stand for about six hours. This operation I repeat once or twice. It is important that the temperature of the water should not exceed 50° Fahrenheit, and in hot weather, when the temperature of the water or the external atmosphere exceeds 50° Fahrenheit, ice should be used or any other refrigerator may be employed to keep the temperature of the mass during maceration at or below 50° Fahrenheit.

It is desirable to carefully close the top of the macerating vessel to exclude putrefactive ferments and bacteria. After the maceration the solution of the iodoglobulin is removed from the insoluble portion of the gland, which may be done by any suitable means, such as by decantation, filtration, or in a centrifugal machine or filter-press. The insoluble portion may also be washed with water in order to remove any mother liquid adhering to it and this be added to the solution obtained as aforesaid. The water is then evaporated from the solution at a temperature not exceeding 212° Fahrenheit, such evaporation being preferably effected on a water or steam bath, so that the temperature can be carefully regulated. The iodoglobulin is thus obtained in the form of a dry extract, which is equal to about seventeen per cent. of the weight of the gland used. The portion of the gland insoluble by this aqueous maceration may then be washed with a liquid capable of dissolving fatty animal matter, such as ether, petroleum-spirit, or benzene. If, however, the fat has been carefully removed in the first instance, I do not find this treatment with a fat-dissolving liquid to be necessary, because the quantity of fat then present in the said portion is so small as to be negligible and not prejudicial in any way to the quality of the resulting product. I then add to the said portion an aqueous solution of caustic soda, potash, or ammonia, or the carbonates of these alkalies, or their chemical equivalents. I prefer, however, to use a one-per-cent. aqueous solution of caustic soda in the proportion of about one part, by weight, of caustic soda to one hundred parts, by weight, of the original gland. I then boil the whole for about an hour. The part not removed by maceration, as aforesaid, enters into solution in the alkali and is afterward separated (which may be done by filtering or pouring off) from the substance still remaining undissolved. The solution so obtained is then carefully and exactly neutralized with acid, such as dilute hydrochloric acid, and the water is carefully evaporated at a temperature not exceeding 212° Fahrenheit, the resulting product being obtained in a dry pulverulent form and equal in weight to about eight per cent. of the original weight of the glands employed and containing or consisting of all the thyroiodin. It is then intimately mixed in a finely-pulverulent state with the dry iodoglobulin prepared as hereinbefore described, from the same original weight of glands.

The dry mixture, which is equivalent in weight to about twenty-five per cent. of the weight of the original gland, contains the whole of the active principles of the thyroid gland and those upon which its well-known physiological effects depend.

I have found by careful and extensive experiments that the mixture possesses all the therapeutic properties known to be possessed by the thyroid gland in certain forms of disease—for example, in the treatment of myxedema, obesity, and psoriasis—and that in all respects it is fully equal to the gland itself without being accompanied by any of the disadvantages I have hereinbefore pointed out and which it is one of the objects of my invention to obviate. It can also be easily kept for any reasonable period without deterioration and without losing its remedial and medicinal properties. I find from experiment that it may be administered with advantage in doses of from four to five grains at a time and that such dose is equal in quantity and effect to about half a thyroid gland of average size and weight as obtained from the sheep. It may be conveniently administered in powder, or it may be made up into a pill by a suitable excipient, or in a compressed form, or according to other methods generally practiced in pharmacy.

What I claim is—

1. The production of thyroiodin from the thyroid gland, consisting in first extracting the iodoglobulin therefrom, and then boiling the residue in dilute caustic alkaline solution, and afterward neutralizing the solution so obtained, and then evaporating it to dryness at a temperature not exceeding 212° Fahrenheit, substantially as described.

2. The process of treating the thyroid gland for the purpose specified, said process consisting in macerating the minced, chopped or ground gland in an excess of cold water, then evaporating the solution so obtained to dryness at a temperature not exceeding 212° Fahrenheit to obtain iodoglobulin, then boiling in dilute caustic alkaline solution the residue resulting from the maceration of the gland in cold water as above set forth, then neutralizing the solution so obtained and finally evaporating it to dryness at a temperature not exceeding 212° Fahrenheit, substantially as described.

3. The process of treating the thyroid gland, consisting in first extracting the iodoglobulin therefrom, and then from the residue extracting the thyroiodin, substantially as described.

4. The process consisting in first extracting the iodoglobulin from the thyroid gland, then extracting the thyroiodin from the residue remaining after such operation, and finally mixing together the iodoglobulin and the thyroiodin in the proportions in which they are obtained, substantially as described.

5. A composition of matter useful for medicinal purposes, consisting of a mixture of iodoglobulin and thyroiodin, free from all other substances with which they are associated in their natural state as set forth.

6. A composition of matter useful for medicinal purposes consisting of a mixture of iodoglobulin and thyroiodin, free from all other substances with which they are associated in their natural state in the proportions in which said substances are present in the thyroid gland, substantially as set forth.

In testimony whereof I have signed this specification in the presence of two subscribing witnesses.

EDW. C. C. STANFORD.

Witnesses:
JNO. INGRAM HAY,
JOHN RUSSELL AITKEN.